United States Patent [19]

Motodate et al.

[11] Patent Number: 4,710,599
[45] Date of Patent: Dec. 1, 1987

[54] SWITCH ATTACHMENT STRUCTURE FOR USE ON MOTOR VEHICLES WITH HANDLEBARS

[75] Inventors: Shoji Motodate; Yuichi Morino; Norihiro Kurata, all of Saitama, Japan

[73] Assignee: Honda Giken Kogyo Kabushiki Kaisha, Tokyo, Japan

[21] Appl. No.: 849,000

[22] Filed: Apr. 7, 1986

[30] Foreign Application Priority Data

Apr. 30, 1985 [JP] Japan .................................. 60-92532

[51] Int. Cl.$^4$ .............................................. H01H 9/06
[52] U.S. Cl. .................................... 200/61.85; 200/296
[58] Field of Search ................. 200/52 R, 5 R, 61.54, 200/61.85, 61.87, 61.88, 157, 294–296; 180/322, 333

[56] References Cited

U.S. PATENT DOCUMENTS

| | | | |
|---|---|---|---|
| 3,339,050 | 8/1967 | Mitchell | 200/295 |
| 3,571,548 | 3/1971 | Osika | 200/295 |
| 3,713,670 | 1/1973 | Reynolds | 200/295 |
| 3,974,352 | 8/1976 | Pitel et al. | 200/307 X |
| 4,277,658 | 7/1981 | Delp et al. | 200/295 X |
| 4,327,264 | 4/1982 | Botz et al. | 200/295 |
| 4,336,428 | 6/1982 | Berginski | 200/61.54 |
| 4,346,274 | 8/1982 | Mutschler et al. | 200/295 |
| 4,404,438 | 9/1983 | Honju | 200/61.54 |
| 4,455,463 | 6/1984 | Röhl | 200/61.85 |
| 4,508,944 | 4/1985 | Yashima et al. | 200/61.85 |
| 4,565,909 | 1/1986 | Yashima et al. | 200/61.85 |
| 4,570,078 | 2/1986 | Yashima et al. | 200/61.85 X |
| 4,574,651 | 3/1986 | Nordstrom | 200/61.85 X |
| 4,590,340 | 5/1986 | Koike et al. | 200/61.54 |

FOREIGN PATENT DOCUMENTS 2932238 2/1981 Fed. Rep. of Germany ... 200/61.85

Primary Examiner—J. R. Scott
Attorney, Agent, or Firm—Irving M. Weiner; Joseph P. Carrier; Pamela S. Burt

[57] ABSTRACT

A switch attachment structure on a motor vehicle having an handlebar such as a motor scooter, a motorcycle, a snowmobile, or the like includes a handle cover fixed to the handlebar and at least partly covering the handlebar, and a plurality of switches mounted on the handle cover for controlling electric components on the motor vehicle. The handle cover has a plurality of juxtaposed switch attachment seats to which the switches are fittingly attached, respectively.

21 Claims, 27 Drawing Figures

SWITCH ATTACHMENT STRUCTURE FOR USE ON MOTOR VEHICLES WITH HANDLEBARS

BACKGROUND OF THE INVENTION

1. Field of the Invention

The present invention relates to an attachment structure for switches for controlling electric parts on motor vehicles with handlebars such as motorcycles, motor scooters, or the like.

2. Discussion of Relevant Art

Two- and three-wheeled motorcycles, motor scooters, and snowmobiles have handlebars for steering purposes. In such motor vehicles, switches for controlling various electric components, such for example as a dimmer switch for headlights, a switch for a horn, a switch for winkers or turn signal lamps, and a starter switch for starting a self-starter, are fixed to the handlebar near the grips thereof so that they can easily be operated by the driver's thumbs while the handlebars are being gripped by the driver's hands.

It has been desired that an attachment structure for such switches be constructed in order to allow the driver to operate the switches easily and smoothly and also to make the assembly and disassembly of the switches on the motor vehicles quick and easy, thereby decreasing both assembly time and service/repair time.

SUMMARY OF THE INVENTION

It is an object of the present invention to provide a switch attachment structure of novel construction which will meet the aforesaid desiderata rements better than conventional switch attachment structures.

To achieve the above object, there is provided an attachment structure for switches for controlling electric parts on a motor vehicle having a handlebar. The switch attachment structure includes a handle cover secured to the handlebar in covering relation to the handlebar. The handle cover has a plurality of switch attachment seats in which the switches are fixedly inserted.

The above and further objects, details and advantages of the present invention will become apparent from the following detailed description of preferred embodiments thereof, when taken in conjunction with the accompanying drawings.

DETAILED DESCRIPTION OF THE PREFERRED EMBODIMENTS

Figure 1:
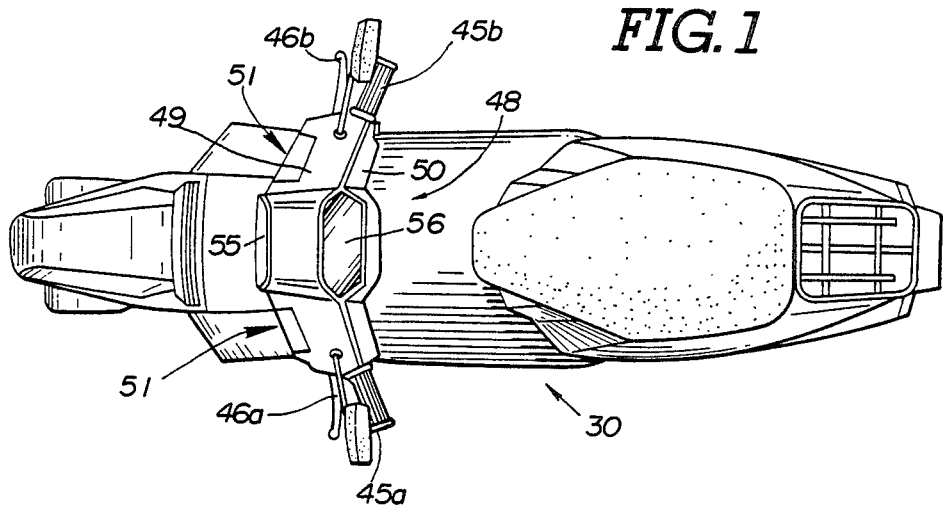
FIG. 1 is a plan view of a motor scooter incorporating a switch attachment structure according to a first embodiment of the present invention.
Figure 2:
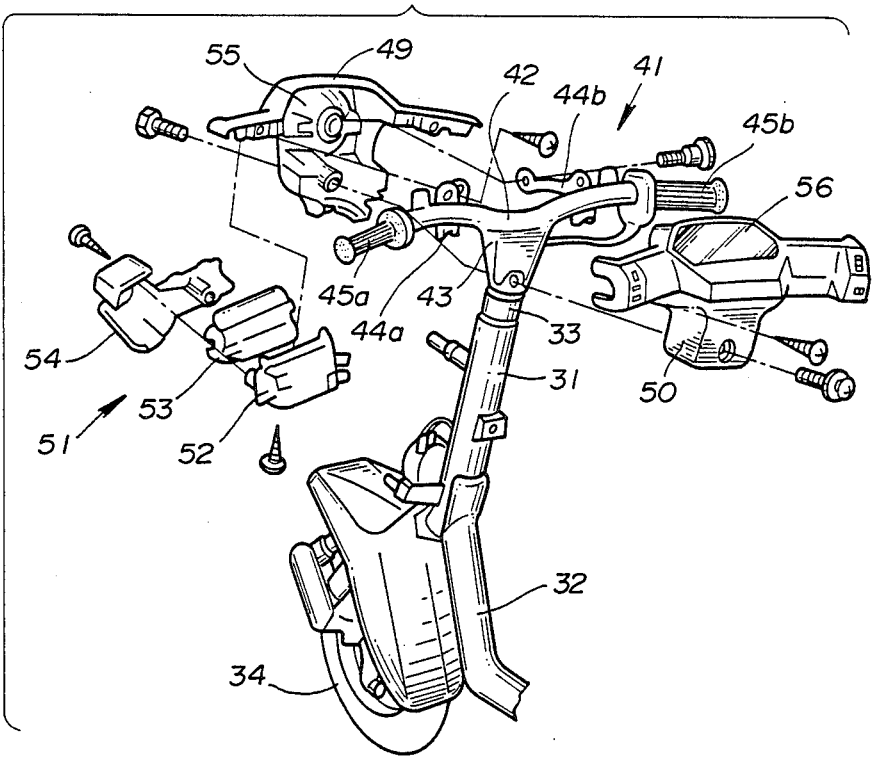
FIG. 2 is an exploded perspective view of a front portion of the motor scooter shown in FIG. 1, with some parts detached or omitted from illustration.

FIG. 1 shows a motor scooter, generally designated by the reference numeral 30, which has a switch attachment structure according to a first embodiment of the present invention. The switch attachment structure of the present invention can also be incorporated in various other motor vehicles with handlebars, such as a motorcycle, a three-wheeled motor vehicle designed for use on rough terrain, and a snowmobile. FIG. 2 illustrates a front portion of the motor scooter of FIG.

1, with some components detached or omitted from illustration.

As shown in FIGS. 1 and 2, the motor scooter 30 includes a frame comprising a head tube 31 extending vertically and inclined slightly rearwardly and a lower tube 32 coupled to a lower end portion of the head tube 31 and extending rearwardly therefrom. A steering shaft 33 is rotatably inserted in the head tube 31 and has a lower end to which there is connected a front fork supporting a front wheel 34.

A handle assembly 41 is fixedly connected to the upper end of the steering shaft 33. The handle assembly 41 comprises a handlebar 42, a central bracket 43 by which the handlebar 42 is fixed to the steering shaft 33, and a pair of side brackets 44a, 44b mounted on the handlebar 42, one on each side of the central bracket 43. The handlebar 42 supports handle grips 45a, 45b and brake levers 46a, 46b on its opposite ends. The brake lever 46a on the lefthand side serves to actuate a front brake associated with the front wheel 34. The brake lever 46b on the righthand side serves to actuate a rear brake associated with a rear wheel (not shown). The handle grip 45b on the righthand side is operatively connected to the throttle valve of the motor scooter engine (not shown).

The handle assembly 41 is covered with a handle cover 48. The handle cover 48 comprises a front cover member 49, a rear cover member 50, and a pair of winker assemblies 51, 51 which are securely coupled together. Each of the winker assemblies 51 includes a winker base 52 supporting a winker or turn signal lamp, a winker lens 53 attached to the front side of the winker base 52, and a winker cover 54 covering the winker lens 53. The winker base 52, the winker lens 53, and the winker cover 54 are securely assembled together. The front cover member 49 is fastened by screws to the central bracket 43 and the side brackets 44a, 44b of the handle assembly 41. The rear cover member 50 has a lower central portion fixed by a screw to the central bracket 43 and a pair of lateral end portions fixed by screws to the front cover member 49.

The front cover member 49 has an opening defined in its central portion and accommodating a headlight 55 therein which is secured by screws to the side brackets 44a, 44b of the handle assembly 41. The rear cover member 50 also has an opening defined in its central portion and accommodating a speedometer 56 therein which is supported on the rear cover member 50. The lateral opposite ends of the handle cover 48 are held respectively against the inner ends of the handle grips 45a, 45b.

Figure 3:
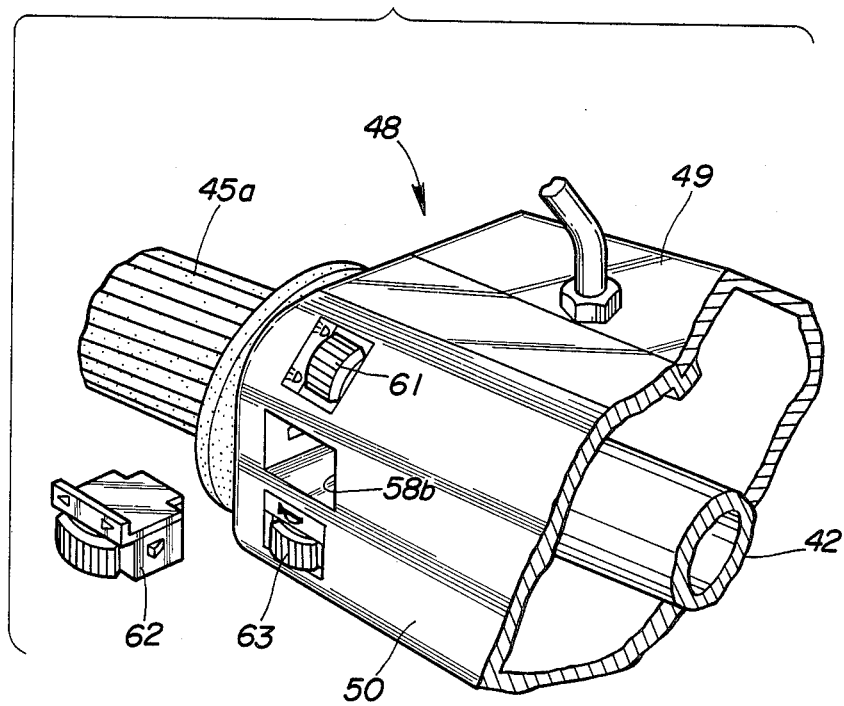
FIG. 3 is a fragmentary perspective view of a portion of a handlebar of the motor scooter shown in FIG. 1 and the switch attachment structure of the first embodiment mounted on the handlebar.
Figure 4:
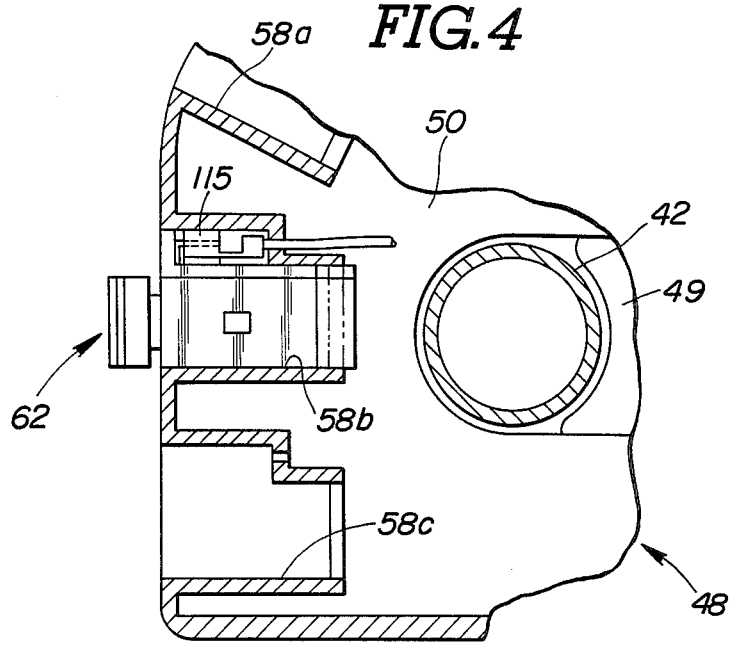
FIG. 4 is a fragmentary, vertical, cross-sectional view of the switch attachment structure of FIG. 3, showing an attachment recess for a winker switch.

As illustrated in FIGS. 3 and 4, the handle cover 48 has three switch attachment recesses 58a, 58b, 58c defined in a portion near the lefthand handle grip 45a and aligned vertically. In these switch attachment recesses 58a, 58b, 58c, there are inserted and attached a dimmer switch 61 for controlling a light beam emitted from the headlight 55, a winker switch 62 for controlling turn signals, and a horn switch 63 for energizing and deenergizing a horn (not shown).

The dimmer switch 61 and the winker switch 62 comprise three-position switches of the same construction as shown in FIGS. 6 through 10. Each of these three-position switches comprises a box-shaped switch body 101 with its upper end open, a switch knob 102 angularly movably disposed in the switch body 101 and having a pair of movable contacts 103, and a switch body cover 105 mounted on and closing the upper open end of the switch body 101. The switch body 101 is in the form of a box molded of synthetic resin and having a hole 101a defined in its front wall, a pivot pin 101d projecting upwardly from its bottom wall, three click grooves 101b defined in the inner surface of a rear side wall thereof, and a pair of engagement teeth 101c on the outer surfaces of a pair of side walls.

The switch knob 102 is angularly movably mounted on the pivot pin 101d extending through a pin insertion hole 102a defined in the switch knob 102. The switch knob 102 includes a finger-operated member 102b on its front end disposed out of the switch body 101 through the hole 101a, and a casing 102c on its rear end housing a spring 106 and a ball 107. The ball 107 is normally urged by the spring 106 to move rearwardly against the rear wall of the switch body 101. The switch knob 102 also includes a pair of support arms 102d on its opposite sides, respectively, which support the movable contacts 103, respectively, that are normally urged by respective springs 109 to move upwardly against the lower surface of the switch body cover 105. The switch knob 102 further includes a closure member 102e positioned between the finger-operated member 102b and the support arms 102d within the switch body 101 and closing the hole 101a for preventing entry of water and dust into the switch body 101. The hole 101a is covered with the front surface of the closure member 102e and the rear surface of the finger-operated member 102b.

Figure 6:
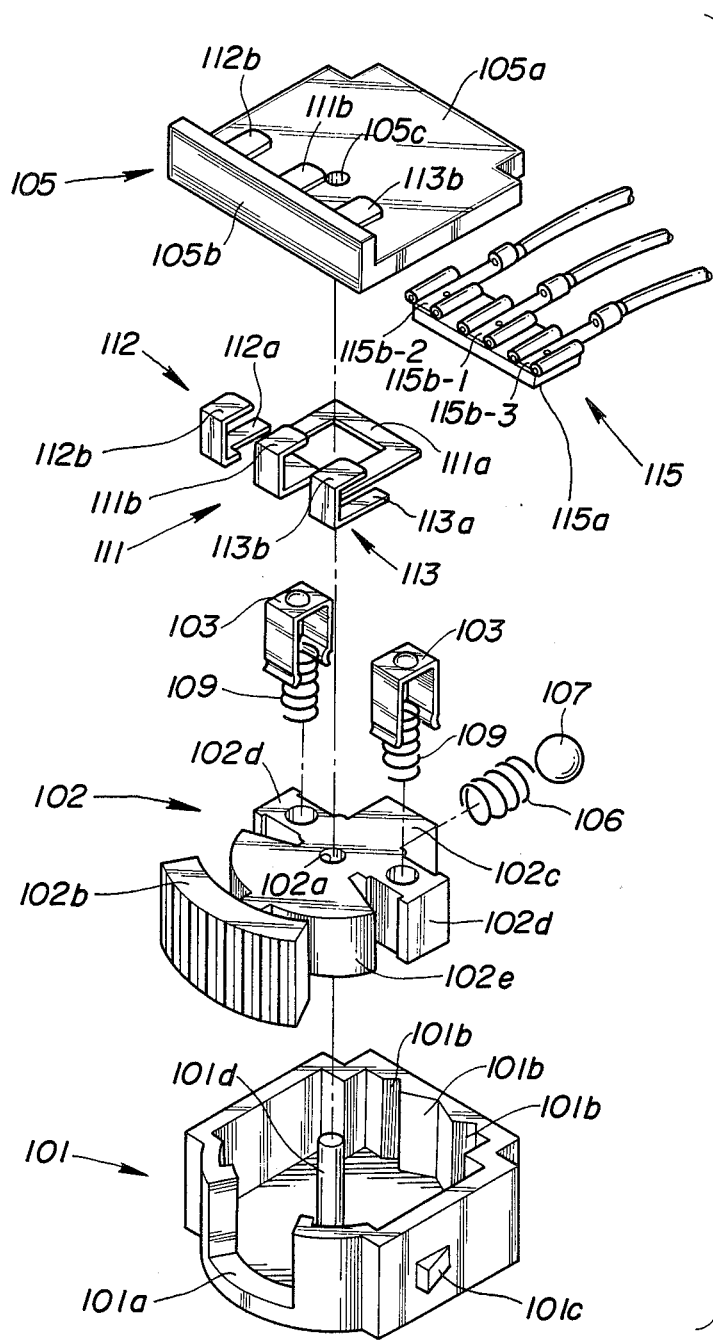
FIG. 6 is an exploded perspective view of a three-position switch in the switch attachment structure of FIG. 3.
Figure 7:
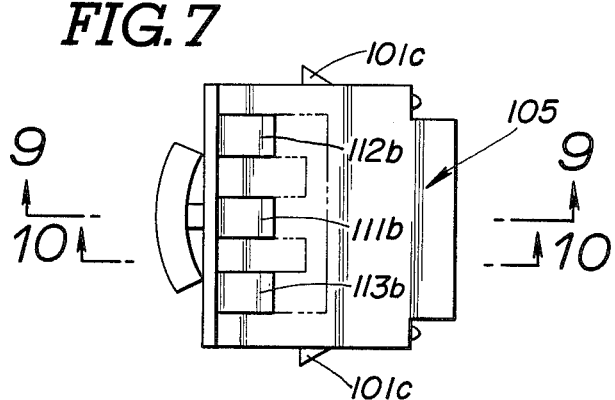
FIG. 7 is a plan view of the three-position switch shown in FIG. 6.
Figure 8:
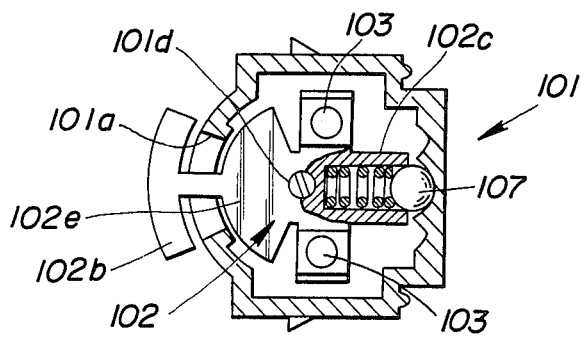
FIG. 8 is a horizontal, cross-sectional view of the three-position switch of FIG. 7.
Figure 9:
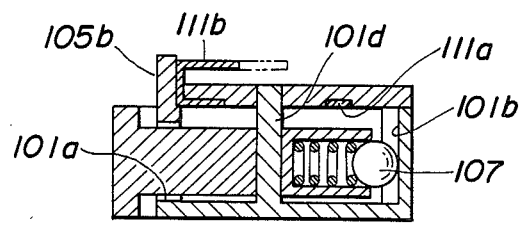
FIG. 9 is a cross-sectional view taken along line 9—9 of FIG. 7.
Figure 10:
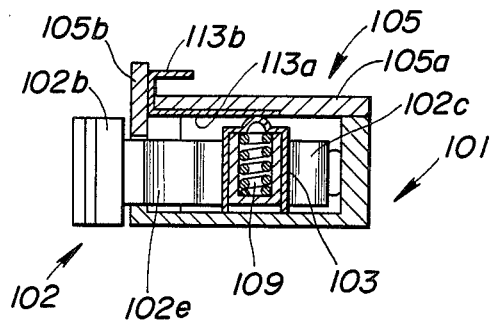
FIG. 10 is a cross-sectional view taken along line 10—10 of FIG. 7.

The switch body cover 105 comprises a cover plate 105a covering the upper open side of the switch body 101 and an upstanding wall 105b on the front edge of the cover plate 105a. The cover plate 105a supports three fixed contacts 111a, 112a, 113a on its inner (lower) surface and three switch terminals 111b, 112b, 113b on its outer (upper) surface which are adjoined respectively to the fixed contacts 111a, 112a, 113a. The switch body cover 105 includes a main member molded of synthetic resin and including the cover plate 105a and the upstanding wall 105b, and three metal pieces 111, 112, 113 inserted in the main member. The three metal pieces 111, 112, 113 have portions serving as the fixed contacts 111a, 112a, 113a and portions serving as the switch terminals 111b, 112b, 113b. These metal pieces 111, 112, 113 are shown in FIG. 6 as being detached from the main member for a better understanding of their shapes.

The switch body cover 105 is manufactured as follows: A one-piece component having such a shape that the three metal pieces 111, 112, 113 are interconnected at the switch terminals (as indicated by the imaginary lines in FIGS. 7 and 9) is blanked from a metal sheet. Then, the blanked one-piece component is bent at a right angle along a boundary line of the fixed contacts. The bent one-piece component is set as an insert in the mold by which the switch body cover 105 will be molded. A switch body cover product is then formed by insert molding. When the molded product is removed from the mold, the three fixed contacts 111a, 112a, 113a are exposed on the lower surface thereof. As shown in FIG. 6, the first fixed contact 111a in the form of a rectangular ring shape is positioned centrally in the switch body cover, whereas the second and third fixed contacts 112a, 113a are positioned one on each side of the first fixed contact 111a. Those portions of the one-piece component which are contiguous to the fixed contacts extend through the cover plate 105a upwardly along the upstanding wall 105b. These upwardly extending portions are then bent at a right angle down against the outer surface of the cover plate 105a, followed by cutting off the interconnected portion, whereupon the one-piece component is seperated into the three metal pieces 111, 112, 113. As an alternative, the fixed contacts may be formed on the switch body cover 15 by a printing process.

For assembly, the distal end of the pivot pin 101d of the switch body 101 with the switch knob 102 mounted thereon is fitted in a hole 105c defined in the cover plate 105a of the switch body cover 105. Then, the upper open side of the switch body 101 is covered with the switch body cover 105. The three-position switch thus assembled is of a closed construction with the finger-operated member 102b and the three switch terminals 111b, 112b, 113b projecting out of the switch housing composed of the switch body 101 and the switch body cover 105. Appropriate signs or symbols indicative of switch operations are thereafter inscribed on the front surface of the upstanding wall 105b of the switch body cover 105.

When the three-position switch is in a neutral position (shown in FIG. 8), the two movable contacts 103 are held in contact with the first fixed contact 111a only. When the finger-operated member 102b is manually turned downwardly in FIG. 8, the switch knob 102 is angularly moved about the pivot pin 101d to bring one of the movable contacts 103 into contact with the first and second fixed contacts 111a, 112a to connect them electrically to each other. Conversely, when the finger-operated member 102b is manually turned upwardly in FIG. 8, the other movable contact 103 is brought into contact with the first and third fixed contacts 111a, 113a to connect them electrically to each other.

Figure 11:
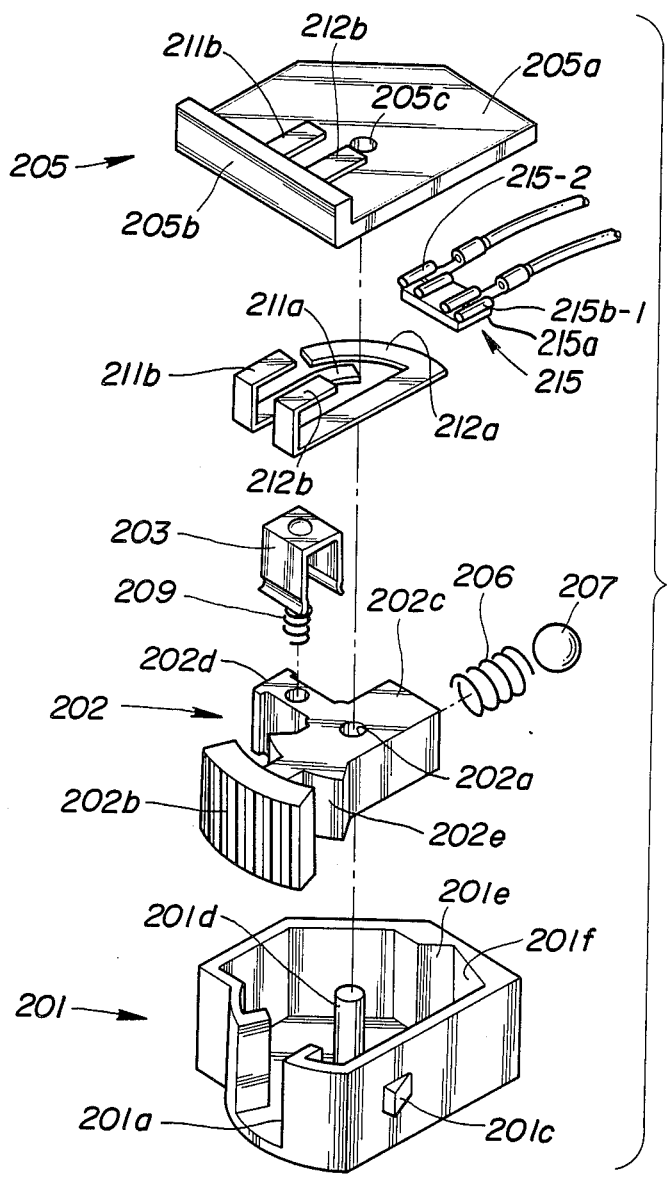
FIG. 11 is an exploded perspective view of a single-throw switch in the switch attachment structure illustrated in FIG. 3.

FIG. 11 shows a single-throw switch for use as the horn switch 63. The single-throw switch comprises a box-shaped switch body 201 having an open upper side, a switch knob 202 angularly movably mounted in the switch body 201 and having a movable contact 203, and a switch body cover 205 having two fixed contacts 211a, 212a and two switch terminals 211b, 212b coupled respectively to the fixed contacts 211a, 212a. The fixed contacts 211a, 212a and the switch terminals 211b, 212b are illustrated as being detached from the switch body cover 205.

The switch body 201 comprises a box molded of synthetic resin and having a hole 201a defined in a front wall thereof, an upstanding pivot pin 201d projecting from a bottom wall thereof, a steep slant surface 201e and a gradual slant surface 201f which are defined on the inner suuface of a rear wall thereof and confront each other, and a pair of engagement teeth 201c on the outer surfaces of a pair of side walls thereof.

The switch knob 202 has a hole 202a defined therein and in which the pivot pin 201d is rotatably fitted. The switch knob 202 has a finger-operated member 202b on its front end and a casing 202c on its rear end which houses a spring 206 and a ball 207, the ball 207 being normally urged by the spring 206 to move rearwardly against the rear wall of the switch body 201. The switch knob 202 also has a support arm 202d projecting laterally from a side thereof and supporting the movable contact 203 which is normally urged by a spring 209 to move upwardly against the lower surface of the switch body cover 205. The switch knob 202 further includes a closure member 202e positioned between the finger-operated member 202b and the support arm 202d for closing the hole 201a.

The switch cover 205 is manufactured in a manner similar to that in which the switch cover 105 (FIG. 6) is manufactured. The switch cover 205 includes a cover plate 205a and an upstanding wall 205b on the front edge thereof. The first fixed contact 211a and the second fixed contact 212a are disposed on the inner (lower) surface of the cover plate 205a, and the switch terminals 211b, 212b are disposed on the outer (upper) surface of the cover plate 205a.

To assemble the single-throw switch of FIG. 11, the switch knob 202 is mounted in the switch body 201 with the pivot pin 201d fitted in the hole 202a and also with the finger-operated member 202b projecting through the hole 201a, and then the switch body cover 205 is mounted on the switch body 201 to cover the open upper side of the switch body 201 with the distal end of the pivot pin 201d fitted in the hole 205c. After the single-throw switch is assembled as a closed switch, suitable marks or symbols are applied to the front surface of the upstanding wall 205b of the switch body cover 205.

When the switch knob 202 is not manually operated or in a neutral position, the movable contact 203 is held in contact with the first fixed contact 211a only, and the switch is in an OFF position. When the finger-operated member 202b is manually operated, the switch knob 202 is turned about the pivot pin 201d to bring the movable contact 203 into contact with the first and second fixed contacts 211a, 212a to connect them electrically to each other. Now, the switch is in an ON position. Upon releasing the finger-operated member 202b, the ball 207 is moved on the gradual slant surface 201f under the resiliency of the spring 206 back into abutment against the steep slant surface 201e, whereupon the switch is in the OFF position.

Connectors which are designed to be coupled to the three-position and single-throw switches will be described below. As shown in FIG. 6, a connector 115 for coupling engagement with the three-position switch comprises a base board 115a of synthetic resin and a plurality of couplers 115b-1, 115b-2, 115b-3 of metal disposed in juxtaposed relation on the base board 115a and connected respectively to the switch terminals 111b, 112b, 113b. Each of the couplers 115b-1, 115b-2, 115b-3 is connected to its own connecting cord. It is convenient to manufacture the connector 115 by an insert molding process in which the couplers 115b-1, 115b-2, 115b-3 are placed as inserts. As shown in FIG. 11, a connector 215 coupled to the single-throw switch is of a similar construction in that metal couplers 215b-1, 215b-2 connected to their respective connecting cords are disposed in juxtaposed relation on a base board 215a of synthetic resin.

Figure 5:
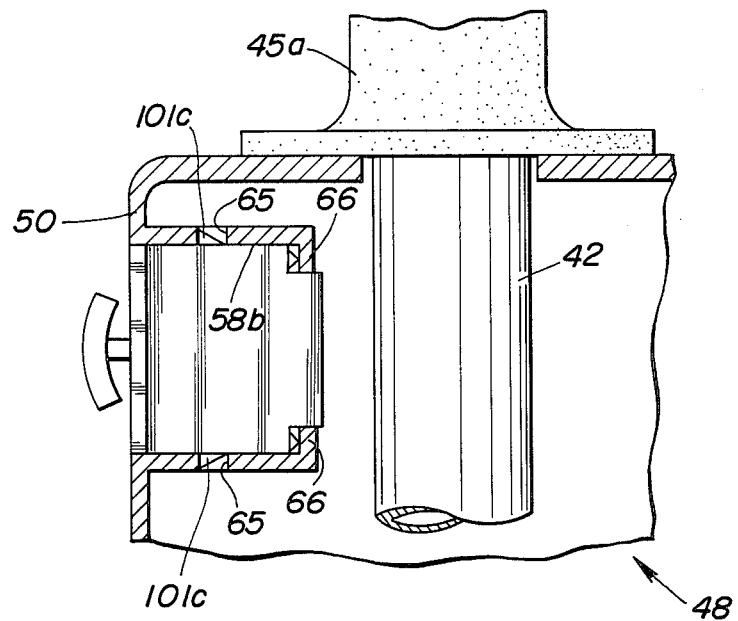
FIG. 5 is a fragmentary, horizontal, cross-sectional view of the winker switch attachment recess illustrated in FIG. 4.

These connectors are mounted respectively in the switch attachment recesses 58a, 58b, 58c in the switch cover 48. The connectors and the associated switches are attached to each other in the same manner for all of the switches. Therefore, only the manner in which the winker switch 62 and its connector 115 are connected to each other will be described with reference to FIGS. 4 and 5. The connector 115 is fixed to one side wall of the switch attachment recess 58b before the winker switch 62 is attached to the switch cover 48. Then, the winker switch 62 is pushed into the switch attachment recess 58b until the switch terminals of the winker switch 62 are connected to the couplers of the connector 115, whereupon the engagement teeth 101c of the switch 62 are seated in respective holes 65 defined in side walls of the switch attachment recess 58b. The winker switch 62 is firmly held in position in the switch attachment recess 58b under the resiliency of the bottom wall 66 of the switch attachment recess 58b. The horn switch 63 is also securely mounted in the switch attachment recess 58c in the same manner as described above.

Although not shown, an emergency engine stop switch connected in series with an ignition switch, a starter switch, and the like can be attached to the handle cover 48 in a similar manner.

The dimmer switch, the winker switch, the emergency engine stop switch, and the like are structurally identical to each other, while the horn switch, the starter switch, and the like, which are of the single-throw type, are structurally identical to each other. By mounting these switches as suitably combined on the handle cover 48, the assembling procedure and parts inventory control are simplified for an increased rate of production. Even when a different switch combination is to be used for a model change, the switch combination can be attached to the handle cover without altering the structures of the switches. Stated otherwise, various switches of the same function to be attached to the handle cover of a motor scooter or a motorcycle, for example, are manufactured in identical construction, and are mounted in a suitable combination on the handle cover. This simplifies the assembling procedure and parts inventory control for a higher production rate. The switches can be used without any structural alteration when a model change requiring a different switch combination is made.

Figure 12:
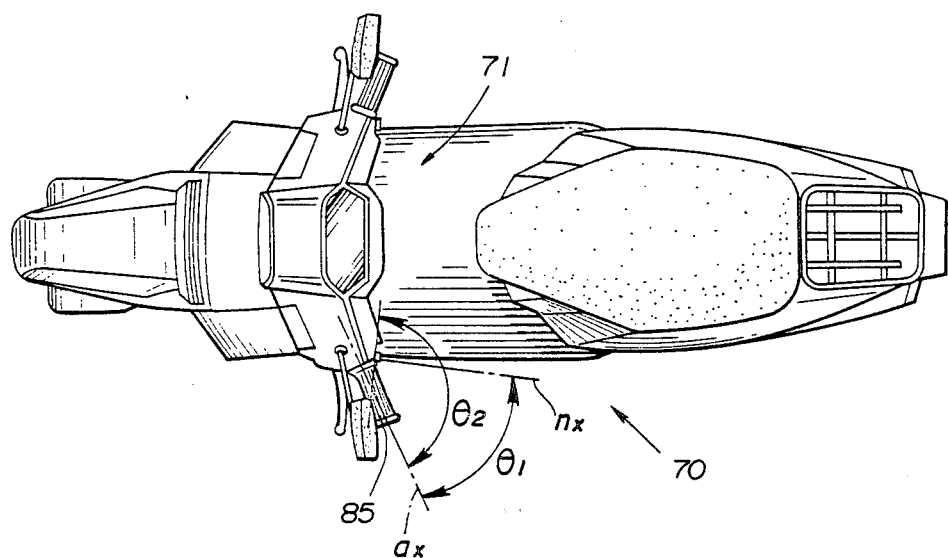
FIG. 12 is a plan view of a motor scooter incorporating a switch attachment structure according to a second embodiment of the present invention.

A switch attachment structure according to a second embodiment of the present invention will be described with reference to FIGS. 12 through 15. FIG. 12 shows in plan a motor scooter having a switch attachment structure of the second embodiment. The motor scooter, generally denoted at 70, is of the same construction as that shown in FIG. 1 except for the switch attachment structure on a handle cover 71.

Figure 13:
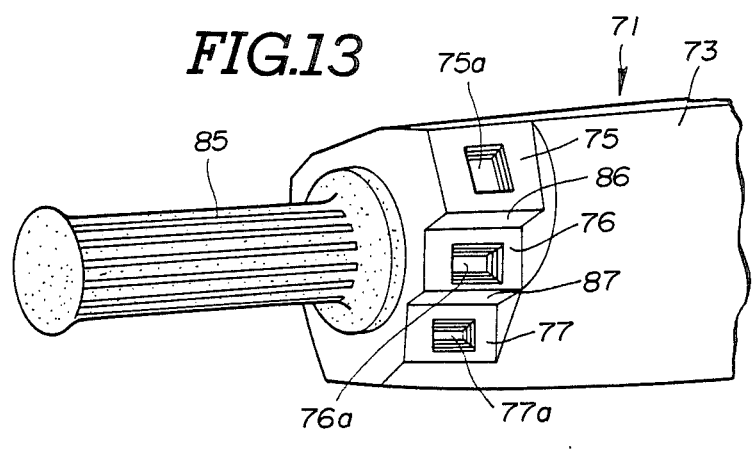
FIG. 13 is a fragmentary perspective view of a lefthand portion of a handlebar of the motor scooter shown in FIG. 12, the view showing a plurality of switch attachment seats.
Figure 14:
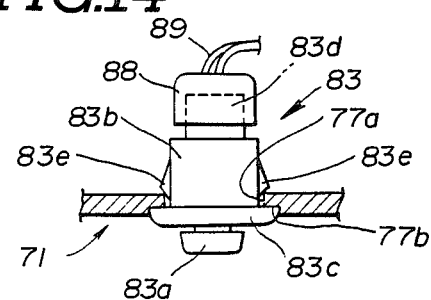
FIG. 14 is a cross-sectional view showing the manner in which a horn switch is mounted in the switch attachment structure of the second embodiment.
Figure 15:
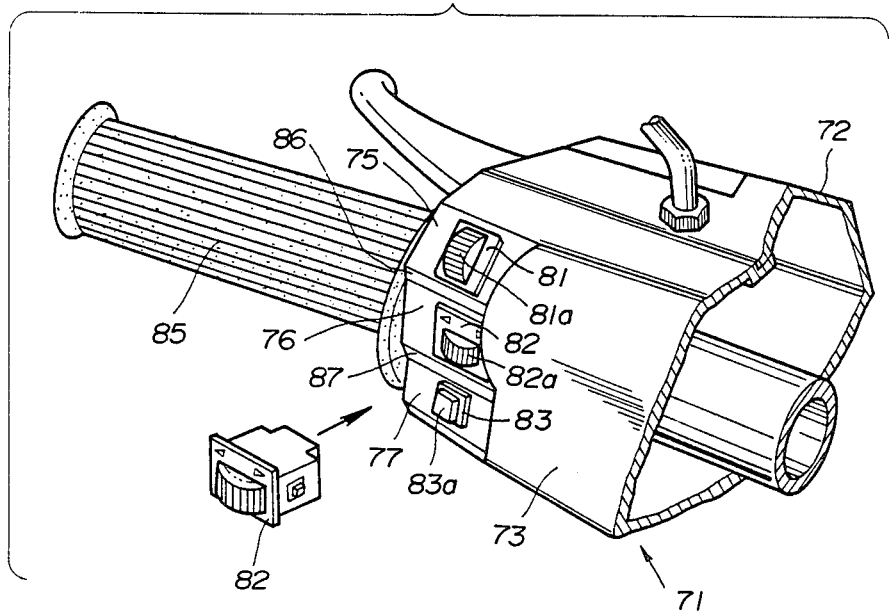
FIG. 15 is a fragmentary perspective view of the switch attachment structure of the second embodiment.

As illustrated in FIGS. 13 through 15, the handle cover 71 comprises a front cover member 72 and a rear cover member 73. The rear cover member 73 has three switch attachment seats 75, 76, 77 defined on a lefthand end portion adjacent to each other in substantially vertical alignment, the switch attachment seats 75, 76, 77 supporting a dimmer switch 81, a winker switch 82, and a horn switch 83, respectively. As shown in FIG. 12, each of the surfaces of the switch attachment seats lies in a plane extending at an obtuse angle $\theta 2$, slightly smaller than 180°, to the axis ax of a lefthand grip 85. Therefore, a line nx normal to each of the surfaces of the switch attachment seats extends at an acute angle $\theta 1$, slightly smaller than 90°, to the axis ax of the lefthand grip 85. The switch attachment seats are directed as described above so as to facilitate driver's action on the switches. A step 86 is defined between the switch attachment seats 75, 76 which are adjacent to each other in the vertical direction, and similarly a step 87 is defined between the switch attachment seats 76, 77 which are adjacent to each other in the vertical direction. The lower switch attachment seat 77 is positioned forwardly of the middle switch attachment seat 76, which is positioned forwardly of the upper switch attachment seat 75. The switch attachment seats 75, 76, 77 have respective rectangular openings 75a, 76a, 77a defined therein and in which the switches 81, 82, 83 are mounted respectively.

As illustrated in FIG. 15, the dimmer switch 81 on the upper switch attachment seat 75 and the winker switch 82 on the middle switch attachment seat 76 have movable lever-type finger-operated members 81a, 82a, respectively, and the horn switch 83 on the lower switch attachment seat 77 has a movable pushbutton-type finger-operated member 83a. These switches are mounted on the respective switch attachment seats through the same arrangement. Therefore, only the construction by which the horn switch 83 is mounted on the switch attachment seat 77 will be described below. As shown in FIG. 14, the horn switch 83 has a substantially box-shaped switch body 83b including a flange 83c on its front wall on which the movable finger-operated member 83a is mounted. The switch body 83b also has on its rear wall a coupling 83d for connection to a connector 88 by which the switch 83 is connected to wires or connecting cords 89. The switch body 83b further includes a pair of wedge-shaped stoppers 83e on its opposite side walls, the stoppers 83e being retractable into the switch body 83b.

For mounting the switch 83 on the handle cover 71, the switch 83 is first forced into the opening 77a of the switch attachment seat 77 from the exterior of the handle cover 71. After the switch 83 has been forced into place, the wall of the switch attachment seat 77 is clamped between the flange 83c and the stoppers 83e of the switch 83, which is now retained on the handle cover 71. The switch attachment seat 77 has a recess 77b extending around the opening 77a. With the flange 83c partly fitted in the recess 77b, the switch 83 is securely retained on the switch attachment seat 77 and rain water and dust are effectively prevented from entering into the handle cover 71 around the edges of the switch 83. The connector 88 to be fitted over the coupling 83d of the switch 83 is of such a size as to be capable of passing through the opening 77a in which the switch 83 is to be mounted. Therefore, the connector 88 may be connected to the switch 83 before the switch 83 is attached to the handle cover 71. The configuration of connectors to be coupled to the dimmer switch 81 and the winker switch 82, and the manner in which these switches are attached ot the handle cover 71 are the same as those described with respect to the horn switch 83.

The switch attachment structure of the second embodiment allows the three switches 81, 82, 83 to be easily and smoothly operated by the thumb of the driver's left hand while it grips the grip 85, and can simply and quickly be assembled.

FIGS. 16 through 27 illustrate a switch attachment structure according to a third embodiment of the present invention. In this embodiment, a dimmer switch 181, a winker switch 182, and a horn switch 183 are attached to the lefthand end of a handle cover 171 covering a handle assembly of a motor scooter (not shown), as with the first and second embodiments. The handle cover 171 comprises a front cover member 172 and a rear cover member 173, as shonw in FIGS. 16 through 18. The front cover member 172 and a handlebar 169 are fragmentarily shown in FIG. 17, whereas the front cover member 172 is detached in FIGS. 16 and 18. Only a portion of the rear cover member 173 on the lefthand side of a central line cl is shown and the handlebar 169 and a grip 185 mounted on an end thereof are indicated by the imaginary lines in FIGS. 16 and 18. The switch attachment structure of the third embodiment is partly identical to those of the first and second embodiments.

Therefore, the components of the third embodiment which are identical to those of the first and second embodiments will be described only briefly or will not be described, while different components will be described in detail.

Figure 16:
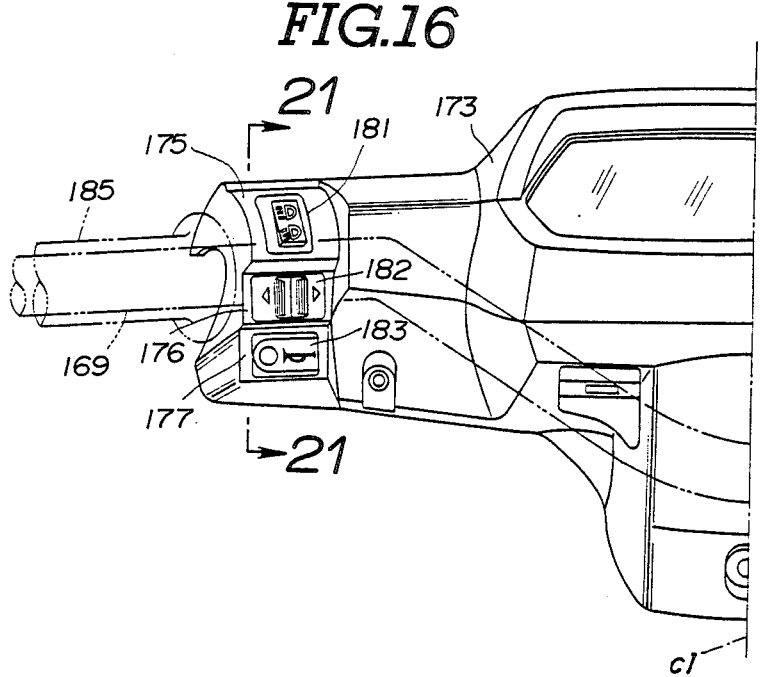
FIG. 16 is a perspective view of a switch attachment structure according to a third embodiment of the present invention, the switch attachment structure being viewed from behind the motor scooter on which it is installed.
Figure 17:
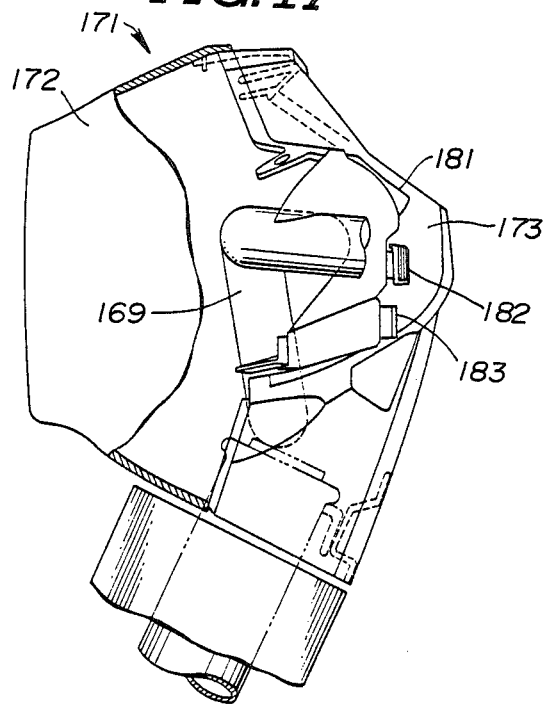
FIG. 17 is a side elevational view, partly in cross section, of a handle cover employed in the switch attachment structure of FIG. 16.
Figure 18:
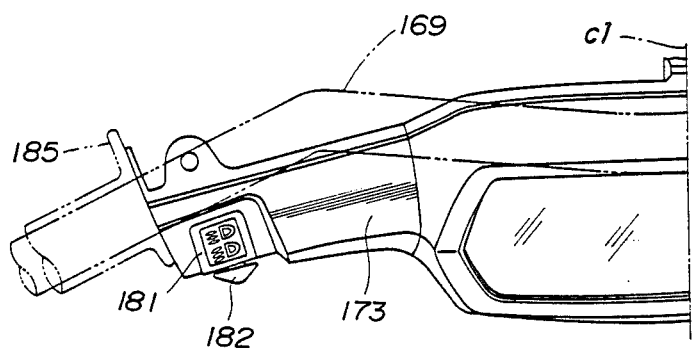
FIG. 18 is a plan view of the handle cover of FIG. 17, with a front cover member omitted from illustration.
Figure 19:
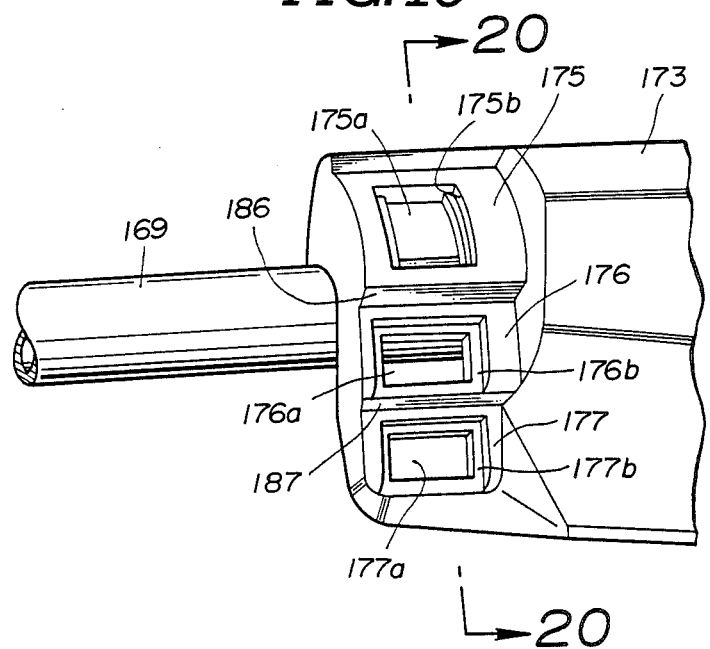
FIG. 19 is an enlarged perspective view of a lefthand end portion of a rear handle cover member in the switch attachment structure shown in FIG. 16, the view showing a plurality of switch attachment seats.

As illustrated in FIGS. 16 and 19, three adjacent switch attachment seats 175, 176, 177 are defined in substantially vertical alignment on the lefthand end of the rear cover member 173, and have respective rectangular openings 175a, 176a, 177a defined therein. The switch attachment structure of the third embodiment mainly differs from that of the second embodiment as to the shape of the upper switch attachment seat 175 to which the dimmer switch 181 is attached and the construction of the switches themselves.

Figure 20:
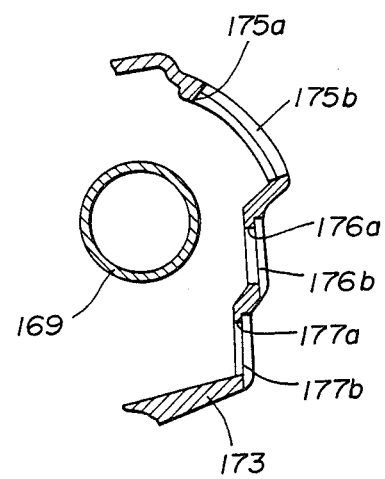
FIG. 20 is a cross-sectional view taken along line 20—20 of FIG. 19.

The upper switch attachment seat 175 has an outer surface substantially in the form of a partly cylindrical wall surface complementary in shape to a flange 181c (FIG. 21) of the dimmer switch 181. As illustrated in FIGS. 19 and 20, the switch attachment seat 175 has a recess 175b defined in its outer surface in surrounding relation to the opening 175a, the flange 181c of the dimmer switch 181 being fitted in the recess 175b.

The middle switch attachment seat 176 on which the winker switch 182 is mounted similarly has a recess 176b defined in surrounding relation to the opening 176b and in which a flange 182c (FIG. 21) of the winker switch 182 is fitted. The lower switch attachment seat 177 on which the horn switch 183 is mounted has a recess 177b defined in surrounding relation to the opening 177a and in which a flange 183c (FIG. 21) of the horn switch 183 is fitted. Like the second embodiment, a step 186 is defined between the adjacent switch attachment seats 175, 176, and a step 187 is defined between the adjacent switch attachment seats 176, 177. The upper end of the lower switch attachment seat 177 is positioned forwardly of the lower edge of the middle switch attachment seat 176, and the upper end of the middle switch attachment seat 176 is positioned forwardly of the lower end of the upper switch attachment seat 175. The surfaces of the middle and lower switch attachment seats 176, 177 extend with respect to the axis of the grip 185 in the same manner as with the first embodiment.

Figure 21:
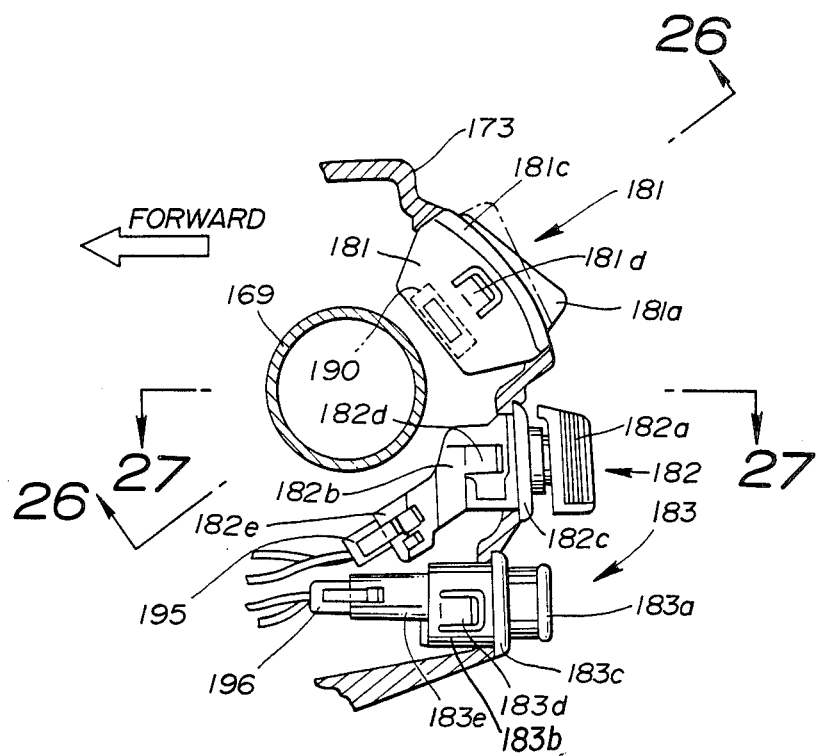
FIG. 21 is a cross-sectional view taken along line 21—21 of FIG. 16.
Figure 22:
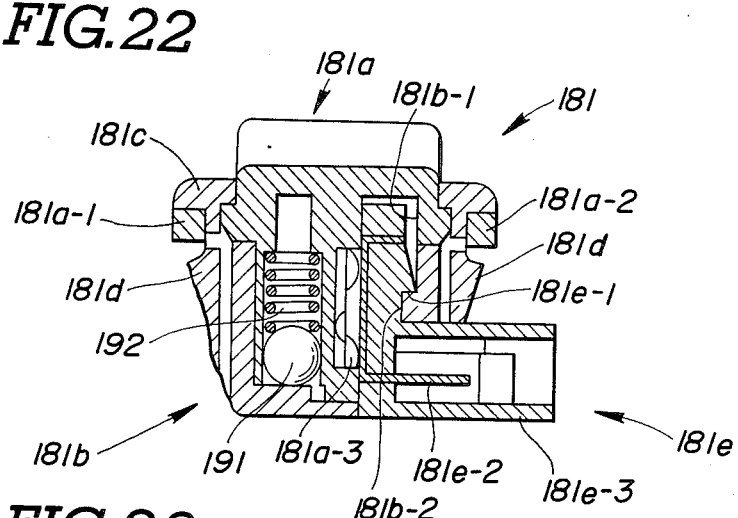
FIG. 22 is a cross-sectional view of a dimmer switch in the switch attachment structure illustrated in FIG. 16.
Figure 25:
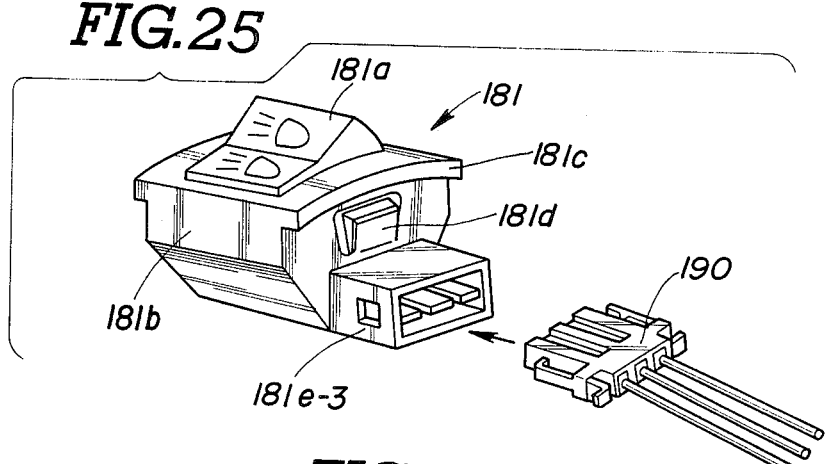
FIG. 25 is a perspective view of the dimmer switch in the switch attachment structure shown in FIG. 16.

The dimmer switch 181 comprises a so-called seesaw switch having a movable seesaw-type finger-operated member 181a. As illustrated in FIGS. 21, 22, and 25, the dimmer switch 181 has a switch body 181b of a substantially trapezoidal shape when seen in side elevation, the switch body 181b being made of synthetic resin. The flange 181c of the dimmer switch 181 is partly cylindrical in shape and formed on the surface of the switch body 181b on which the movable finger-operated member 181a is mounted. The switch body 181b also has a pair of wedge-shaped stoppers 181d on opposite side walls which are retractable into the switch body 181b when pushed. A coupling 181e for connection to a connector 190 by which the dimmer switch 181 is connected to wires or connecting cords is mounted on the side wall of the switch body 181b on which one of the stoppers 181d is disposed.

Figure 26:
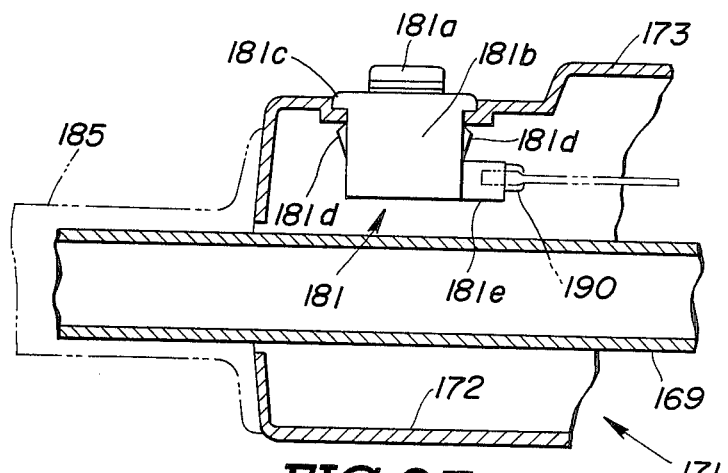
FIG. 26 is a cross-sectional view taken along line 26—26 of FIG. 21.

FIG. 22 shows the dimmer switch 181 in cross section. The movable finger-operated member 181a has a pair of integral shafts 181a-1, 181a-2 rotatably supported on the switch body 181b for angular movement of the finger-operated member 181a between two angularly spaced positions as indicated by the solid and imaginary lines in FIG. 21. The movable finger-operated member 181a has a casing housing a ball 191 and a spring 192 which function in the same way as those used in the first embodiment. The coupling 181e is made of synthetic resin and is inserted upwardly into a cavity 181b-1 in the switch body 181b. The coupling 181e has a tooth 181e-1 engaging a ledge 181b-2 in the cavity 181b-1. Therefore, after the coupling 181e has been inserted in the cavity 181b-1, it is retained therein by the engagement between the tooth 181e-1 and the ledge 181b-2. The coupling 181e houses a plurality of metal pieces 181e-2 molded therein as inserts, each of the metal pieces having a fixed contact and a switch terminal. The fixed contact can contact a movable contact 181a-3 attached to the movable finger-operated member 181a. The function of these fixed and movable contacts is the same as that of the fixed and movable contacts of the first embodiment. The coupling 181e has a socket 181e-3 in which the switch terminals of the metal pieces 181e-2 are exposed, the connector 190 being insertable in the socket 181e-3. The socket 181e-3 projects on one side of the dimmer switch 181. After the dimmer switch 181 has been mounted on the switch attachment seat 175, the socket 181e-3 extends along the handlebar 169 as shown in FIG. 26. Therefore, the distance between the switch 181 and the handlebar 169 can be reduced so that a compact handle cover can be employed.

Figure 23:
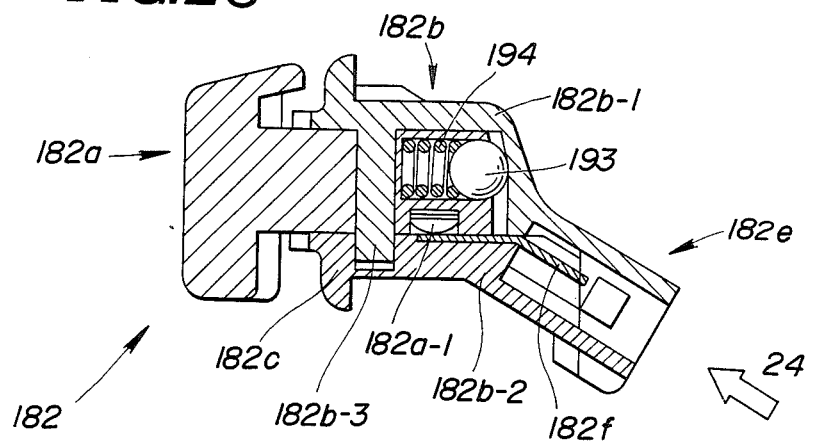
FIG. 23 is a cross-sectional view of a winker switch in the switch attachment structure of FIG. 16.
Figure 24:
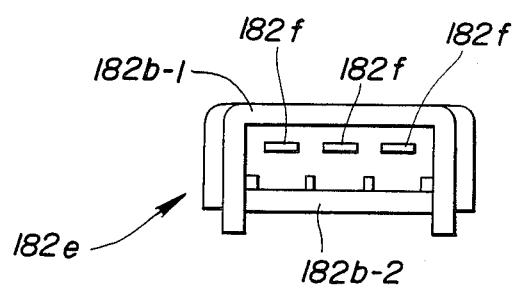
FIG. 24 is a view showing a socket of the winker switch of FIG. 23, as viewed in the direction of the arrow 24 in FIG. 23.

As shown in FIG. 23, the winker switch 182 comprises a three-position switch having a box-shaped switch body 182b of synthetic resin including upper and lower body members 182b-1, 182b-2, and a movable lever-type finger-operated member 182a disposed in the switch body 182b and swingably fitted over a shaft 182b-3 of the switch body 182b. The winker switch 182 is structurally and functionally analogous in many aspects to the three-position switch of the first embodiment. For example, a ball 193 and a spring 194 are structurally and functionally the same as those of the first embodiment. Accordingly, those analogous parts will not be described in detail. As shown in FIGS. 23 and 24, the winker switch 182 has three metal pieces 182f sandwiched between the upper and lower body members 182b-1, 182b-2 and each having a fixed contact and a switch terminal. The fixed contact can contact a plurality of movable contacts 182a-1 attached to the movable finger-operated member 182a. The switch body 182b has a socket 182e extending rearwardly and downwardly from the rear and lower edge thereof, the switch terminals of the metal pieces 182f being exposed in the socket 182e. A connector 195 (FIGS. 21 and 27) is inserted in the socket 182e. After the winker switch 182 has been attached to the switch attachment seat 176, the socket 182e extends circumferentially along the surface of the handlebar 169. With the socket 182e thus arranged, the distance between the winker switch 182 and the handlebar 169 can be reduced as with the dimmer switch 181. The winker switch 182 has a pair for wedge-shaped stoppers 182d on opposite side walls which are retractable into the switch body 182b upon being pushed.

As illustrated in FIG. 21, the horn switch 183 comprises a box-shaped switch body 183b, a movable push-button-type finger-operated member 183a and a socket 183e extending rearwardly from the rear wall of the switch body 183b and receptive of a connector 196. The switch body 183b has a pair of wedge-shaped stoppers 183d on opposite side walls thereof which are identical to the stoppers of the dimmer and winker switches.

The connectors 190, 195, 196 to be connected to the dimmer, winker, and horn switches, respectively, are so sized that they can pass through the openings 175a, 176a, 177a of the switch attachment seats 175, 176, 177, respectively. Therefore, the switch attachment structure can easily and quickly be assembled.

For attaching the switches to their respective switch attachment seats, the switches are forced into the respective openings of the switch attachment seats from the exterior of the handle cover 171 in the same manner as with the second embodiment. After the switches have been forced into place, the walls of the switch attachment seats are clamped between the flanges and stoppers of the switches.

The arrangement of the stoppers suitable for the above assembling process will be described with respect to the winker switch 182, for example.

Figure 27:
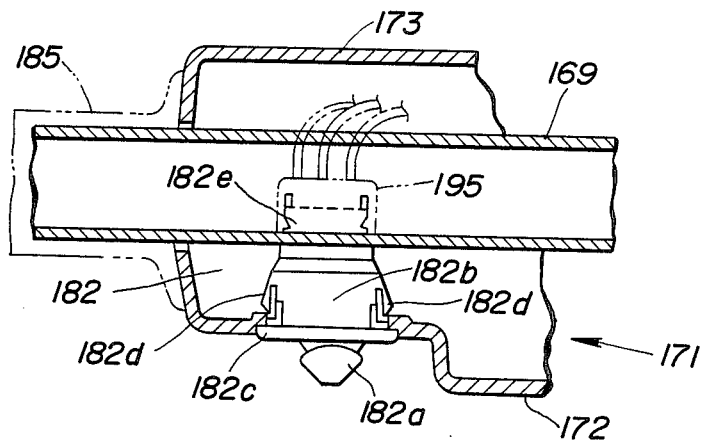
FIG. 27 is a cross-sectional view taken along line 27—27 of FIG. 21.

As shown in FIGS. 21 and 27, the stoppers 182d are integrally formed with the switch body 182b, which is formed of a resilient material such as nylon, for example. The stoppers 182d are substantially in the form of plates having proximal edges joined to the switch body 182b and distal edges angularly movable resiliently. The outer surface of each stopper 182d includes a gradual slant surface extending toward the proximal edge and a steep slant surface extending toward the distal edge. With this arrangement, the winker switch 182 can easily be inserted into the opening 176a of the switch attachment seat 176. After the winker switch 182 has been attached, the wall of the switch attachment seat 176 is clamped between the flange 182c of the winker switch 182 and the distal edges of the stoppers 182d to keep the winker switch 182 retained stably and firmly in the opening 176a.

According to the third embodiment, furthermore, the surfaces of the movable finger-operated members 181a, 182a, 183a of the switches 181, 182, 183, which the driver's thumb will contact in operating these switches, are substantially aligned with a hypothetical circle having its center on the axis of the handlebar 169. This arrangement allows the three switches 181, 182, 183 to be easily and smoothly operated by the thumb of the driver's hand which grips the grip 185 on the handle bar 169, since when the thumb is moved in its natural course, the tip of the thumb substantially follows an arc with its center of curvature aligned with the axis of the grip 185 and hence the handlebar 169. This advantage is assured because the upper switch attachment seat 175 is in the form of a partly cylinderial wall, the flange 181c of the dimmer switch 181 is also in the form of a partly cylindrical wall complementary to the upper switch attachment seat 175, and the flange 181c of the dimmer switch 181 is fitted in the switch attachment seat 175.

Inasmuch as the surface of the dimmer switch 181 is partly cylindrical in shape, the surface of the seesaw-type finger-operated member 181a which is pushed by the driver's thumb can be made substantially flat and be of a reduced height as shown in FIG. 21, so that the dimmer switch 181 can easily and smoothly be operated.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A switch attachment structure on a motor vehicle having a handlebar, comprising:
   a handle cover fixed to the handlebar and at least partly covering said handlebar;
   a plurality of switches mounted on said handle cover for controlling electric components on the motor vehicle;
   said handle cover having a plurality of switch receivers to which said switches are fittingly attached, respectively;
   said switch receivers comprising recesses formed in said handle cover, said recesses being shaped complementarily to switch bodies of said switches; and
   said switches being insertably mounted into said handle cover recesses from outside of said handle cover.

2. A switch attachment structure according to claim 1, wherein said switches have a uniform structural configuration so that they can be interchangeably attached to said switch receivers.

3. A switch attachment structure according to claim 1, wherein said handlebar has a grip, and said switch receivers are disposed adjacent to said grip.

4. A switch attachment structure according to claim 3, wherein said switch receivers are substantially vertically arranged in juxtaposed relation.

5. A switch attachment structure according to claim 4, wherein said switch receivers further comprise switch attachment seats which form portions of said handle cover defining and surrounding said recesses, respectively, each switch attachment seat extending substantially vertically, the lower end of each upper one of two adjacent switch attachment seats projecting beyond the upper end of a lower one of the two adjacent switch attachment seats.

6. A switch attachment structure according to claim 3, wherein said switches have respective finger-operated members including finger-operated portions which are substantially aligned with a hypothetical circle with its center on the axis of said grip.

7. A switch attachment structure according to claim 3, wherein said switch receivers consist of a first switch receiver, a second switch receiver adjacent to and lower than said first switch receiver, and a third switch receiver adjacent to and lower than said second switch receiver, said first switch receiver having a switch attachment seat in the form of a substantially partly cylindrical wall.

8. A switch attachment structure on a motor vehicle having a handle bar, comprising:
   a handle cover fixed to the handlebar and at least partly covering said handlebar;
   a switch mounted on said handle cover for controlling an electric component on the motor vehicle;
   said handle cover having a switch receiver to which said switch fittingly attached;
   an electric connector for being connected to said switch;
   said switch comprising a switch body, a finger-operated member, a coupling integral with said switch body for being connected to said electrical connector, and fastening means for fixing said switch to said switch receiver;

said switch receiver comprising a recess formed in said handle cover, said recess being shaped complementarily to said switch body; and said switch being insertably mounted into said handle cover recess from outside of said handle cover.

9. A switch attachment structure according to claim 8, wherein said coupling of the switch includes a socket for insertion therein of said connector.

10. A switch attachment structure according to claim 9, wherein said socket is disposed on a rear wall of said switch body.

11. A switch attachment structure according to claim 10, wherein said socket substantially extends circumferentially along a surface of said handlebar.

12. A switch attachment structure according to claim 9, wherein said socket is disposed on a side wall of said switch body.

13. A switch attachment structure according to claim 12, wherein said socket substantially extends axially of said handlebar.

14. A switch attachment structure according to claim 9, wherein said switch further comprises a movable contact and a plurality of fixed contacts, said finger-operated member supporting said movable contact, said switch body comprising a first member supporting said finger-operated member and having a recess, and a second member supporting said fixed contacts and inserted in said recess of said first member, said socket being integral with said second member.

15. A switch attachment structure according to claim 9, wherein said switch further comprises a movable contact and a plurality of fixed contacts, said finger-operated member supporting said movable contact, said switch body comprising a first member supporting said finger-operated member and having an extension, and a second member combined with said first member and having an extension, said extensions of said first and second members being combined with each other to constitute said socket.

16. A switch attachment structure according to claim 8, wherein said electric connector is fixed to said handle cover in said switch receiver.

17. A switch attachment structure according to claim 16, wherein said switch has a movable contact and a plurality of fixed contacts, said switch body comprising a first member in the form of a box having an open upper side and housing said finger-operated member, said first member having a pivot pin on which said finger-operated member is angularly movably supported and a hole through which a portion of said finger-operated member extends out of said first member, and a second member closing said open upper side of said first member, said finger-operated member supporting said movable contact, said second member having a plurality of metal pieces inserted therein, said metal pieces serving as said fixed contacts and switch terminals in said coupling.

18. A switch attachment structure according to claim 16, wherein said fastening means comprises engagement teeth on side walls of said switch body, said engagement teeth being so shaped as to attach said switch easily to said handle cover, said switch receiver recess having engagement edges engaging said engagement teeth to retain said switch in said handle cover and a bottom wall held against a rear wall of said switch, said bottom wall being resilient for normally urging said switch to move in a direction to be displaced away from said handle cover.

19. A switch attachment structure according to claim 16, wherein said electric connector comprises a base board of synthetic resin and metal couplers attached to said base board by insert molding.

20. A switch attachment structure according to claim 17, wherein said second member has an upstanding wall, said metal pieces comprising fixed terminal portions exposed on a lower surface of said second member, first intermediate portions contiguous to said fixed terminal portions and extending through said second member, second intermediate portions contiguous to said first intermediate portions and extending along said upstanding wall, and terminal portions contiguous to said second intermediate portions and extending perpendicularly from said upstanding wall.

21. A switch attachment structure according to claim 17, wherein said finger-operated member has a closure member disposed in said switch body for closing said hole through which said portion of the finger-operated member projects out of said first member.

* * * * *

UNITED STATES PATENT AND TRADEMARK OFFICE
CERTIFICATE OF CORRECTION

PATENT NO. : 4,710,599
DATED : December 1, 1987
INVENTOR(S) : Motodate et al.

It is certified that error appears in the above-identified patent and that said Letters Patent is hereby corrected as shown below:

```
Column 1, line 15, change "such for example as" to
--such as, for example,--;
         line 33, after "desiderata" delete
"rements".
Column 5, line 3, change "seperated" to --separated--.
Column 8, line 43, change "ot" to --to--;
         line 59, change "shonw" to --shown--.
Column 12, line 61 (claim 8, line 8), after "switch"
insert --is--.
In the Abstract, line 2, change "an" to --a--.
```

Signed and Sealed this

Thirty-first Day of May, 1988

Attest:

DONALD J. QUIGG

Attesting Officer

Commissioner of Patents and Trademarks